United States Patent
Kawabata et al.

(10) Patent No.: US 9,021,644 B2
(45) Date of Patent: May 5, 2015

(54) METHOD FOR REPLACING SLOPED CABLES, AND TEMPORARY HANGER FOR REPLACING SLOPED CABLES

(71) Applicant: IHI Infrastructure Systems Co., Ltd., Osaka (JP)

(72) Inventors: Satoshi Kawabata, Osaka (JP); Yoshihiko Nakamura, Osaka (JP); Masashi Yabuno, Osaka (JP)

(73) Assignee: IHI Infrastructure Systems Co., Ltd., Osaka (JP)

( * ) Notice: Subject to any disclaimer, the term of this patent is extended or adjusted under 35 U.S.C. 154(b) by 0 days.

(21) Appl. No.: 14/349,051

(22) PCT Filed: Apr. 12, 2013

(86) PCT No.: PCT/JP2013/002508
§ 371 (c)(1),
(2) Date: Apr. 1, 2014

(87) PCT Pub. No.: WO2013/179549
PCT Pub. Date: Dec. 5, 2013

(65) Prior Publication Data
US 2015/0052694 A1 Feb. 26, 2015

(30) Foreign Application Priority Data
Jun. 1, 2012 (JP) ................. 2012-126445

(51) Int. Cl.
*E01D 22/00* (2006.01)
*E01D 11/04* (2006.01)
*F16L 3/16* (2006.01)

(52) U.S. Cl.
CPC ............. *E01D 22/00* (2013.01); *E01D 11/04* (2013.01); *F16L 3/16* (2013.01)

(58) Field of Classification Search
CPC ............ E01D 11/04; E01D 21/00; F16L 3/16
USPC ................................................ 14/18–23, 77.1
See application file for complete search history.

(56) References Cited

U.S. PATENT DOCUMENTS

| 4,352,220 A | * | 10/1982 | Wittfoht | 14/77.1 |
| 4,620,060 A | * | 10/1986 | Perinetti | 174/42 |
| 4,628,560 A | * | 12/1986 | Clevett et al. | 14/2.4 |

(Continued)

FOREIGN PATENT DOCUMENTS

| JP | 61-250204 A | 11/1986 |
| JP | 5-171619 A | 7/1993 |

(Continued)

OTHER PUBLICATIONS

International Searchign Authority, International Search Report for International Application No. PCT/JP2013/002508, Jul. 16, 2013, 3 pages.

*Primary Examiner* — Raymond W Addie
(74) *Attorney, Agent, or Firm* — Alston & Bird LLP

(57) ABSTRACT

A plurality of movable temporary hangers 7 are placed on a stay cable 4B hung in tension above a target stay cable 4C, and then the target stay cable 4C is held on a lower portion of the temporary hangers 7. Then, the target stay cable 4C held with the temporary hanger 7 is detached from a bridge deck 3 and a main tower 2. Then, the target stay cable 4C and the temporary hangers 7 holding the target stay cable 4C are moved toward the bridge deck 3 and removed.

5 Claims, 16 Drawing Sheets

(56) References Cited

U.S. PATENT DOCUMENTS

| | | | | |
|---|---|---|---|---|
| 4,799,279 | A * | 1/1989 | Muller | 14/77.1 |
| 5,896,609 | A * | 4/1999 | Lin | 14/20 |
| 6,292,967 | B1 * | 9/2001 | Tabatabai et al. | 14/22 |
| 6,301,735 | B1 * | 10/2001 | Jartoux et al. | 14/22 |
| 6,681,431 | B2 * | 1/2004 | Zivanovic et al. | 14/22 |
| 6,681,432 | B1 * | 1/2004 | Reinhold | 14/69.5 |
| 6,728,987 | B1 * | 5/2004 | Hinman | 14/77.1 |
| 7,478,450 | B2 * | 1/2009 | Fong | 14/77.1 |
| D641,089 | S * | 7/2011 | Nowak | D25/1 |
| 8,572,787 | B2 * | 11/2013 | Toguchi | 14/18 |
| 8,695,142 | B2 * | 4/2014 | Noh et al. | 14/77.1 |
| 2012/0216357 | A1 * | 8/2012 | Byun et al. | 14/77.1 |
| 2013/0160224 | A1 * | 6/2013 | Noh et al. | 14/21 |

FOREIGN PATENT DOCUMENTS

| | | |
|---|---|---|
| JP | 7-331615 A | 12/1995 |
| JP | 9-78525 A | 3/1997 |

\* cited by examiner

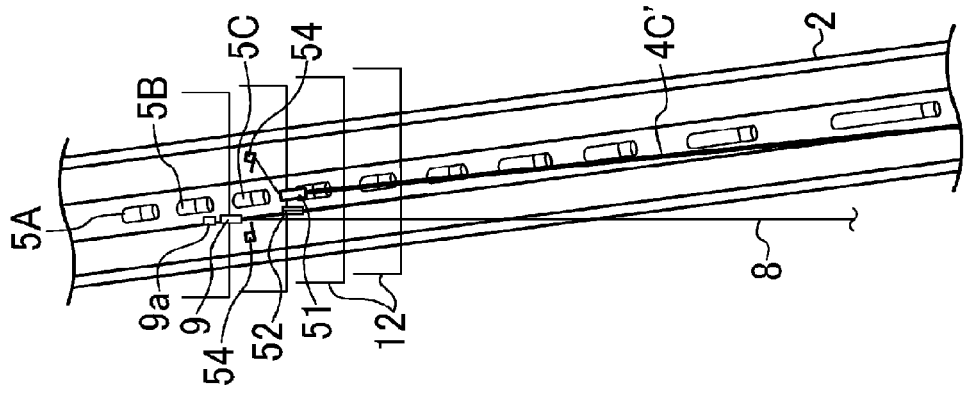
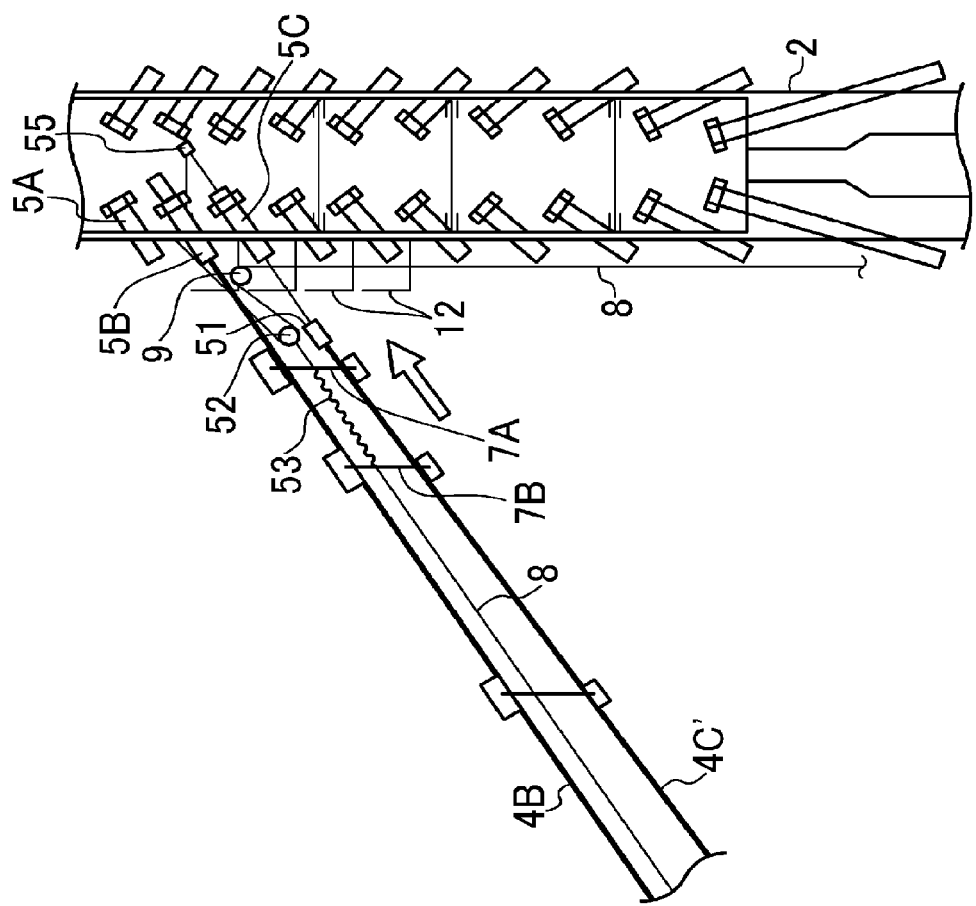

METHOD FOR REPLACING SLOPED CABLES, AND TEMPORARY HANGER FOR REPLACING SLOPED CABLES

CROSS REFERENCE TO RELATED APPLICATIONS

This application is a national stage application, filed under 35 U.S.C. §371, of International Application No. PCT/JP2013/002508, filed Apr. 12, 2013, which claims priority to and the benefit of Japanese Application No. 2012-126445, filed Jun. 1, 2012, the contents of all of which are hereby incorporated by reference in their entirety.

BACKGROUND

The present invention relates to a method for replacing stay cables that support a bridge deck to a main tower, and a temporary hanger for use in this method to replace stay cables.

For example, a cable-stayed bridge is known as a bridge with a bridge deck supported to a main tower by stay cables. FIG. 16A illustrates a structure of a typical cable-stayed bridge. FIG. 16A illustrates that a cable-stayed bridge 101 includes a main tower 102, a bridge deck 103, and a plurality of stay cables 104. The main tower 102 is disposed vertically. The bridge deck 103 is disposed horizontally and crosses the main tower 102. The plurality of stay cables 104 are hung in tension and sloped with respect to the main tower 102 and the bridge deck 103. This structure allows the bridge deck 103 to be supported to the main tower 102 through the stay cables 104.

FIG. 16B illustrates that the stay cable is being hung on the cable-stayed bridge in FIG. 16A (see, e.g., Japanese Unexamined Patent Publication No. H7-331615). FIG. 16B illustrates that a hanging tool 112 of a tower crane 111 is holding a vicinity of one end, of the stay cable 104, which is being fixed to main tower 102. A hanging tool 114 of a mobile crane 113 is holding a vicinity of the other end, of the stay cable 104, which is being moved to a predetermined position opposite to the main tower 102 and being fixed to the bridge deck 103.

FIG. 17A illustrates a structure of a fixing portion, of the stay cable, which is on the bridge deck side. FIG. 17A illustrates that the stay cable 104 is disposed inside an anchor pipe 121 through an upper opening thereof. The anchor pipe 121 is tilted and fixed at a predetermined angle with respect to the bridge deck (not shown). A socket 104a on the bridge deck side is disposed on a tip end of the stay cable 104, and appears from a lower opening of the anchor pipe 121. A bearing plate 122 and a shim plate 123 fix the stay cable 104 in the vicinity of the lower opening of the anchor pipe 121.

FIG. 17B illustrates that the stay cable is being pulled into the fixing portion on the bridge deck side in FIG. 17A. FIG. 17B illustrates that, to pull the stay cable 104, a jack 142 and a strand base 143 are installed on the lower opening of the anchor pipe 121 through a jack base 141. A tension rod 131 is mounted on the socket 104a on the bridge deck side of the stay cable 104. A PC strand 132 is mounted opposite to the socket 104a on the bridge deck side with respect to the tension rod 131. Then, the PC strand 132 is inserted into the anchor pipe 121 to be acted upon by the jack 142, and allows the tension rod 131 to be pulled into the anchor pipe 121. After this primary pulling by the PC strand 132, the strand base 143 is detached for the tension rod 131 to be acted upon by the jack 142, and the stay cable 104 is pulled into the anchor pipe 121. This secondary pulling is conducted by the tension rod 131 until the socket 104a on the bridge deck side of stay cable 104 appears from the lower opening of the anchor pipe 121. Then, as illustrated in FIG. 17A, the stay cable 104 is fixed with the bearing plate 122 and the shim plate 123.

BRIEF SUMMARY

If deteriorated or damaged by, e.g., an accident, the stay cable for supporting a bridge deck to a main tower needs to be replaced. For the replacement, first, the stay cable is detached and removed from the main tower and the bridge deck with, e.g., a tower crane. Then, as illustrated in, e.g., FIG. 16B, a stay cable replacement is brought in and fixed to the main tower and the bridge deck.

However, another stay cable hung in tension above the target stay cable makes it very difficult for the crane to remove and hang the stay cable. Additionally, in the method in FIG. 16B for hanging the stay cable, the stay cable has a large sag, which makes the amount of pulling of the stay cable large. Thus, as illustrated in FIG. 17B, the stay cable requires the primary pulling by the PC strand and the secondary pulling by the tension rod, i.e., the two-step pulling. This increases the number of facilities for pulling the stay cable, and the pulling operation of the stay cable increases in complexity.

It is an object of the present invention to efficiently replace a stay cable with simple facilities when another stay cable is hung in tension above the target stay cable.

To achieve this object, a first method of one embodiment of the present invention is a method for replacing stay cables for supporting a bridge deck to a main tower. The method includes the steps of:

(a) placing a plurality of movable temporary hangers on a stay cable on which the temporary hangers move and which is hung in tension above a target stay cable, and holding the target stay cable in lower portions of the plurality of temporary hangers;

(b) after the step (a), detaching the target stay cable from a bridge deck and a main tower while holding the target stay cable with the plurality of temporary hangers; and (c) after the step (b), moving the plurality of temporary hangers and the target stay cable toward the bridge deck while holding the target stay cable with the plurality of temporary hangers, and detaching the target stay cable from the plurality of temporary hangers.

In this first method of the present invention, the movable temporary hangers are placed on the stay cable which is hung in tension above the target stay cable and on which the temporary hangers move. Then, the target stay cable held with the temporary hangers are detached from the bridge deck and the main tower. Then, the target stay cable and the temporary hangers are moved toward the bridge deck and removed. That is, the target stay cable is removed without, e.g., the tower crane. Thus, this method is useful for replacing a stay cable above which another stay cable is hung in tension. This method allows the target stay cable held with the temporary hangers to be removed, and reduces the sag of the target stay cable during the removing operation. Thus, the stay cable is removed efficiently without an increase in the number of facilities for the removing operation.

A second method of the present invention is a method for replacing stay cables for supporting a bridge deck to a main tower. The method includes the steps of:

(d) in a bridge deck side, holding a stay cable replacement in a lower portion of a plurality of movable temporary hangers placed on a stay cable on which the temporary hangers move;

(e) after the step (d), moving the plurality of temporary hangers and the stay cable replacement toward the main tower while holding the stay cable replacement with the plurality of temporary hangers; and (f) after the step (e), fixing the stay cable replacement to the bridge deck and the main tower while holding the stay cable replacement with the plurality of temporary hangers.

In this second method of the present invention, the stay cable replacement is held with the movable temporary hanger placed on the stay cable on which the temporary hangers move. Then, the stay cable replacement and the temporary hanger are moved toward the main tower. Then, the stay cable replacement is fixed to the bridge deck and the main tower. That is, the stay cable replacement is hung without, e.g., the tower crane. Thus, this method is useful for hanging a stay cable replacement above which another stay cable is hung in tension. This method allows the stay cable replacement held with the temporary hangers to be held, and reduces the sag of the stay cable replacement during the hanging operation. Thus, the stay cable is hung efficiently without an increase in the number of facilities for the hanging operation.

The sag of a stay cable hung with, e.g., a tower crane is large. Thus, the primary pulling by the PC strand and the secondary pulling by the tension rod are required. In contrast, the method of the present invention reduces the sag of a stay cable being hung, and decreases the amount of pulling of the stay cable. Thus, this method allows the stay cable to be fixed to the bridge deck with only the pulling by the tension rod.

In the first or second method of the present invention, the plurality of temporary hangers are guided by a pulling wire hung in tension toward the main tower below the stay cable on which the temporary hangers move. Accordingly, the temporary hangers are moved easily toward the main tower by reeling the pulling wire. The temporary hangers are also moved easily toward the bridge deck by releasing the pulling wire.

A first temporary hanger of the present invention is a temporary hanger for use in the first or second method of the present invention. The temporary hanger includes a plurality of rollers placed on the stay cable on which the temporary hangers move.

The first temporary hanger of the present invention includes the plurality of rollers (casters) serving as stay cable receivers. These receives moves on the stay cable more smoothly than, e.g., a rubber roller that is in contact with the object at one point, and also reduces damage to a covering material (e.g., polyethylene) of the stay cable. The temporary hanger with the rollers (casters) made of a stronger, more flexible material such as urethane than a rubber material has an adequate strength against the load that the temporary hanger holding the stay cable or the stay cable replacement receives.

A second temporary hanger of the present invention is a temporary hanger for use in the first or second method of the present invention. A portion, of the second temporary hanger, located below the stay cable on which the temporary hangers move varies in length.

The distance to the target stay cable or the stay cable replacement varies with the position of the second temporary hanger on the stay cable on which the temporary hangers move. The second temporary hanger varies in length with the variation of the distance to the target stay cable or the stay cable replacement. Thus, the target stay cable or the stay cable replacement is held easily on the lower portion of the second temporary hanger.

In the present invention, a stay cable above which another stay cable is hung in tension is replaced with simple facilities.

DETAILED DESCRIPTION OF THE DRAWINGS

Figure 5A:
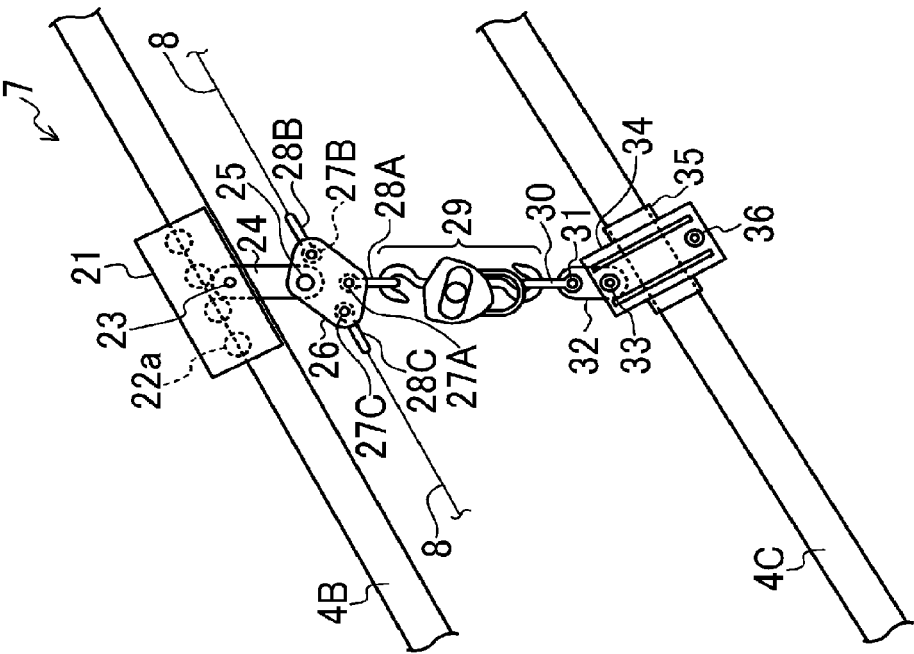
Figure 5B:
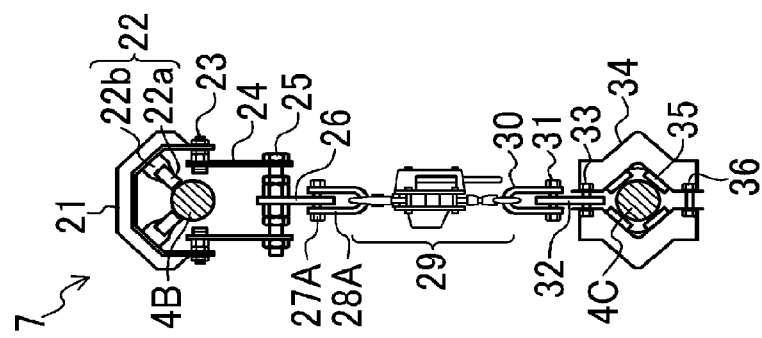

FIGS. 5A and 5B illustrate a detailed structure of a temporary hanger for use in the method of the embodiment for replacing stay cables. FIG. 5A illustrates the temporary hanger viewed along the stay cable. FIG. 5B illustrates the temporary hanger viewed from the lateral side of the stay cable.

Figure 6:
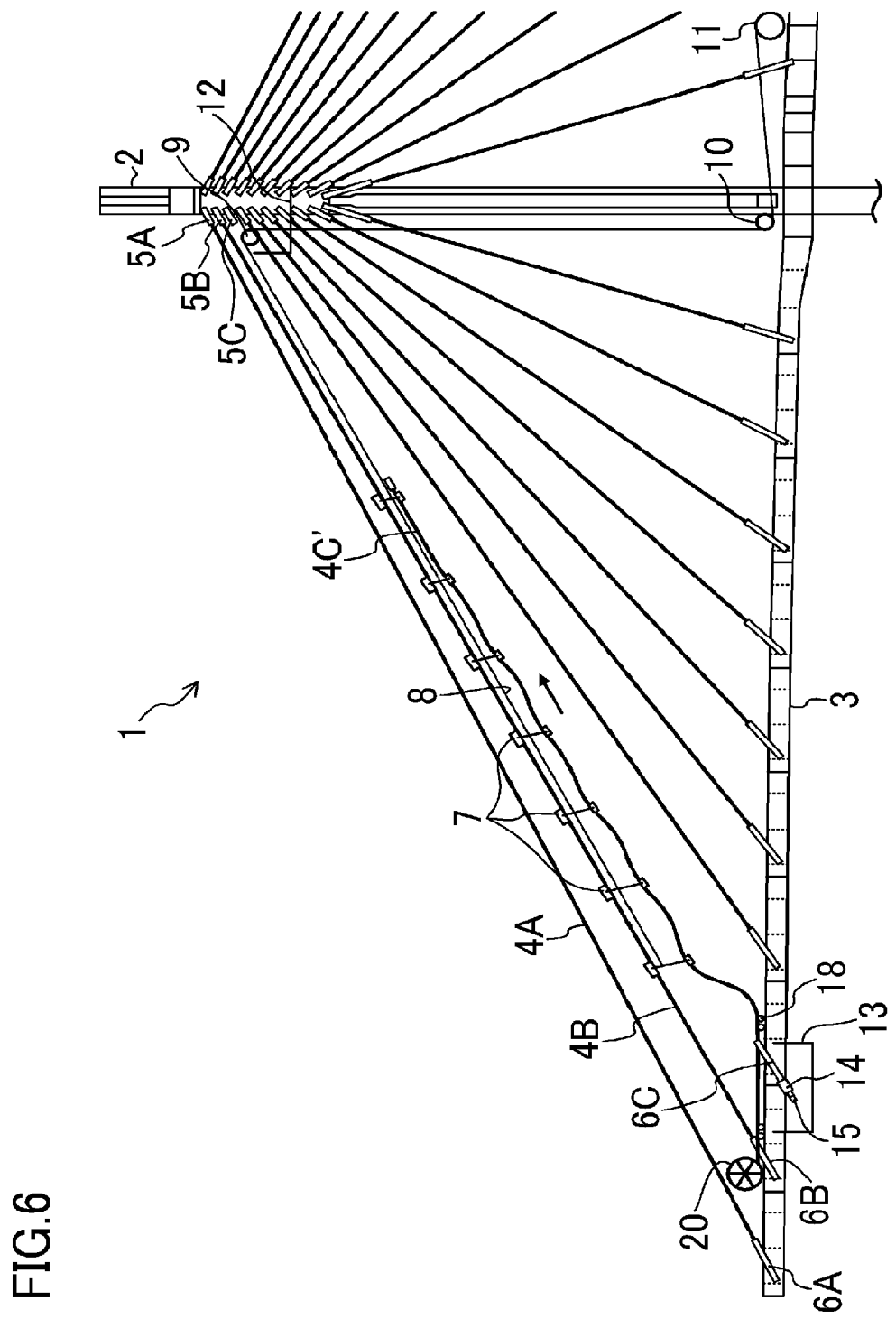

FIG. 6 illustrates one step of hanging a stay cable in the method of the embodiment for replacing stay cables.

Figure 7:
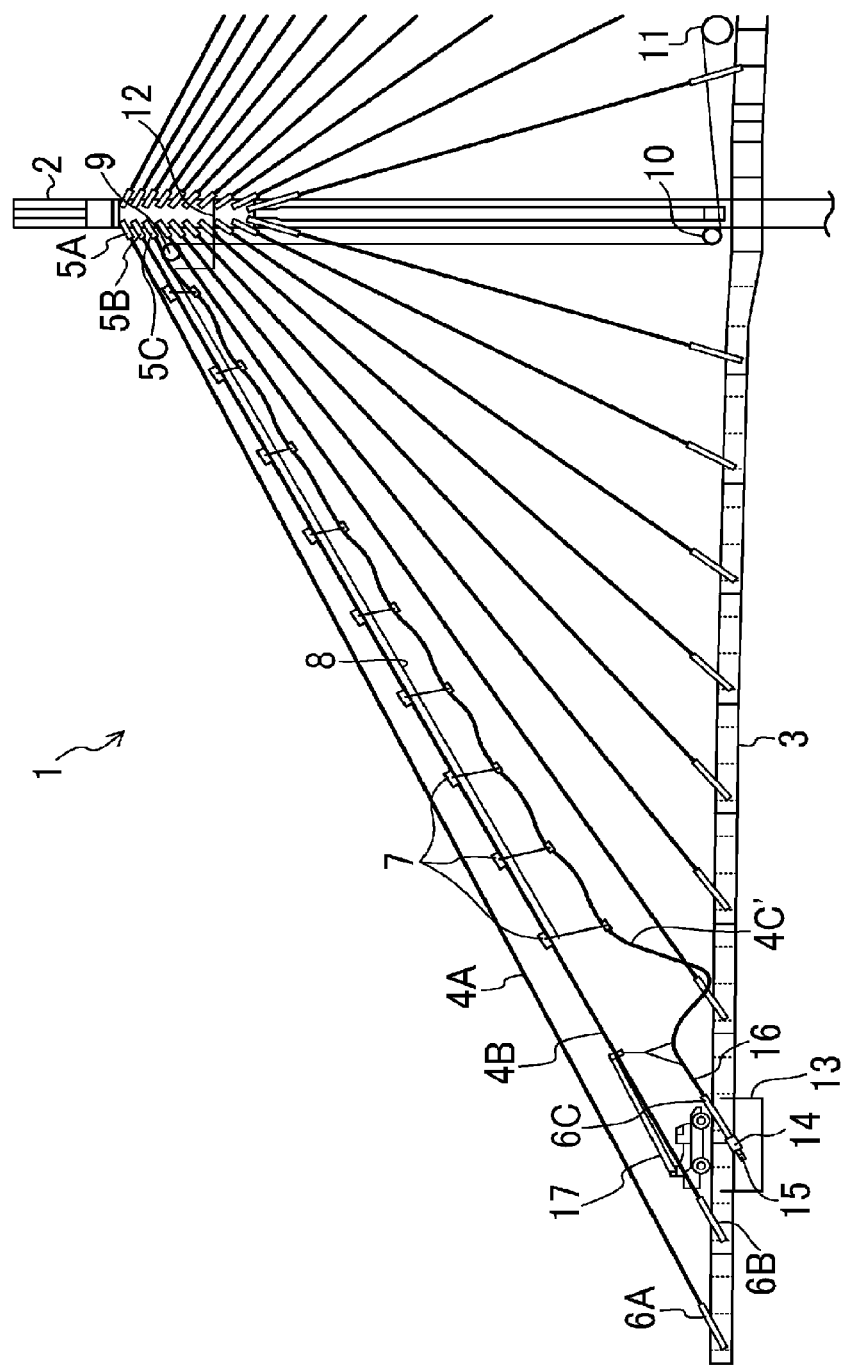

FIG. 7 illustrates one step of hanging the stay cable in the method of the embodiment for replacing stay cables.

Figure 8:
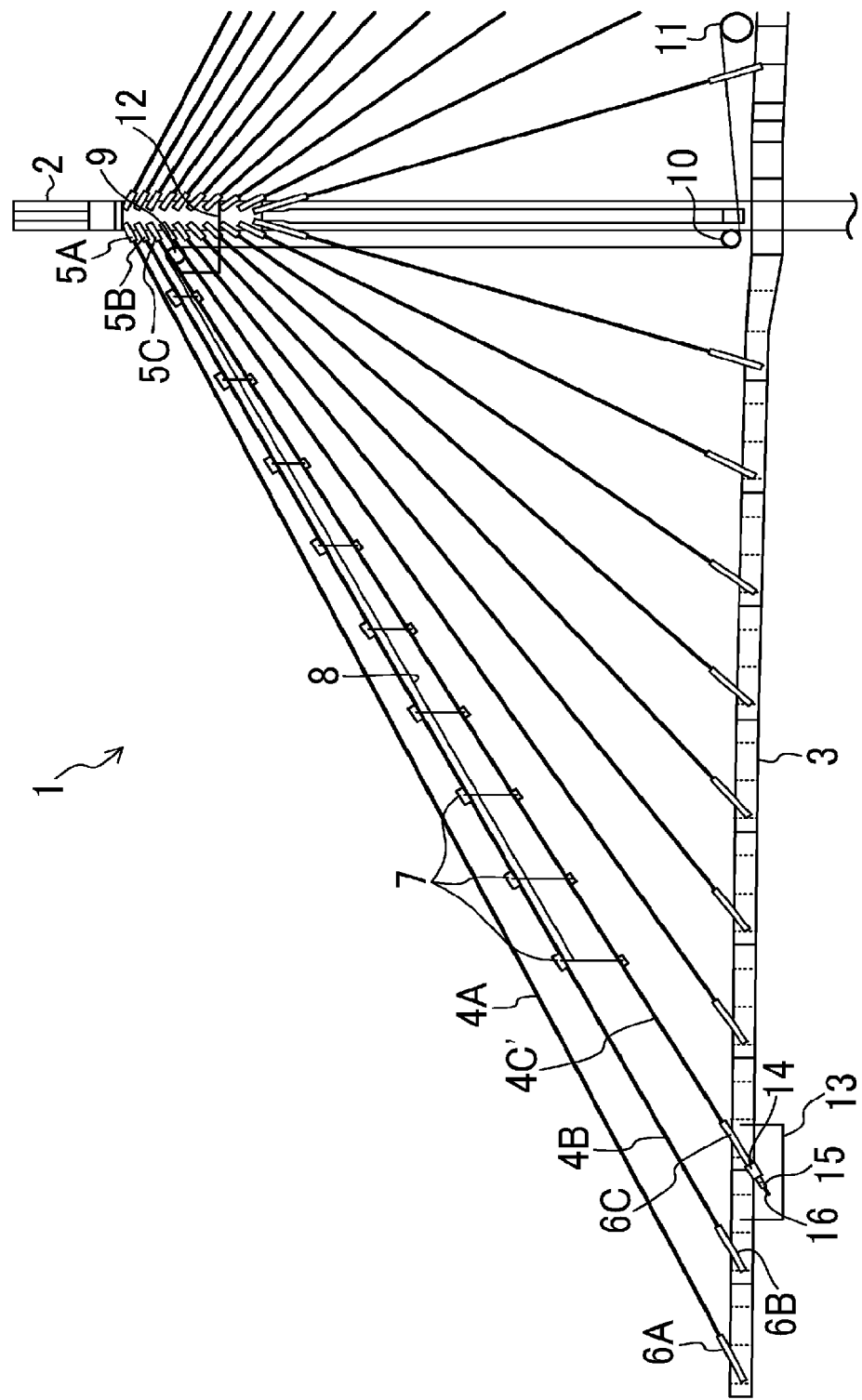

FIG. 8 illustrates one step of hanging the stay cable in the method of the embodiment for replacing stay cables.

Figure 9B:
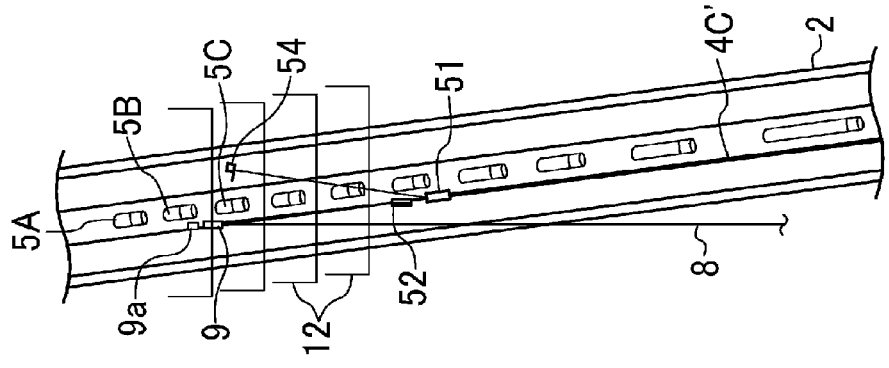
Figure 9A:
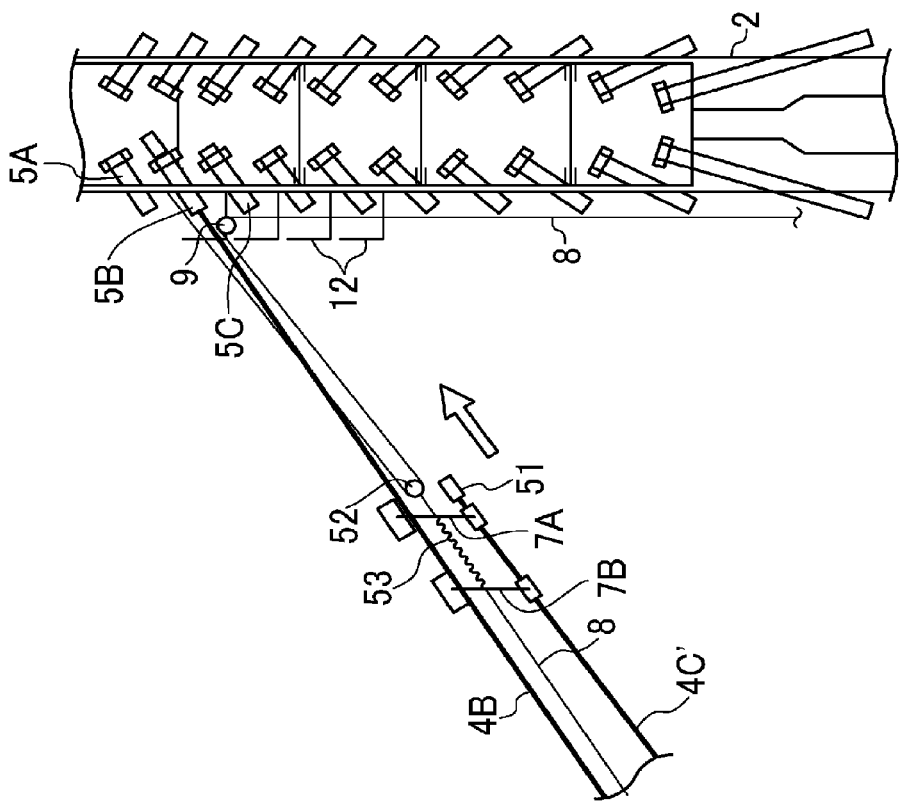

FIGS. 9A and 9B illustrate one step of fixing the stay cable to a main tower in the method of the embodiment for replacing stay cables. FIG. 9A illustrates the main tower viewed from the lateral side of the stay cable. FIG. 9B illustrates the main tower viewed along the bridge deck.

FIGS. 10A and 10B illustrate one step of fixing the stay cable to the main tower in the method of the embodiment for replacing stay cables. FIG. 10A illustrates the main tower viewed from the lateral side of the stay cable. FIG. 10B illustrates the main tower viewed along the bridge deck.

Figure 11B:
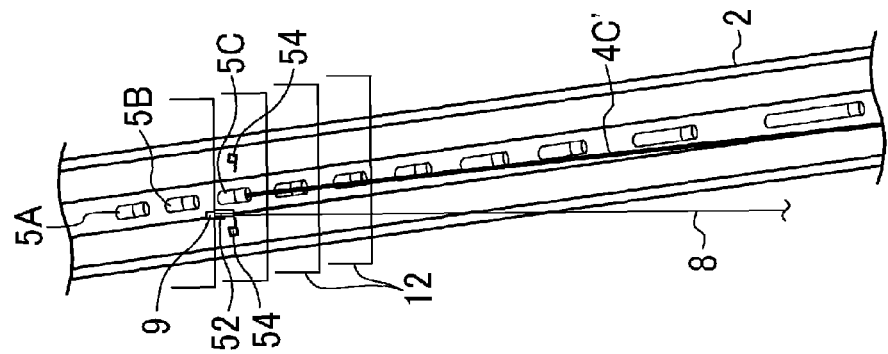
Figure 11A:
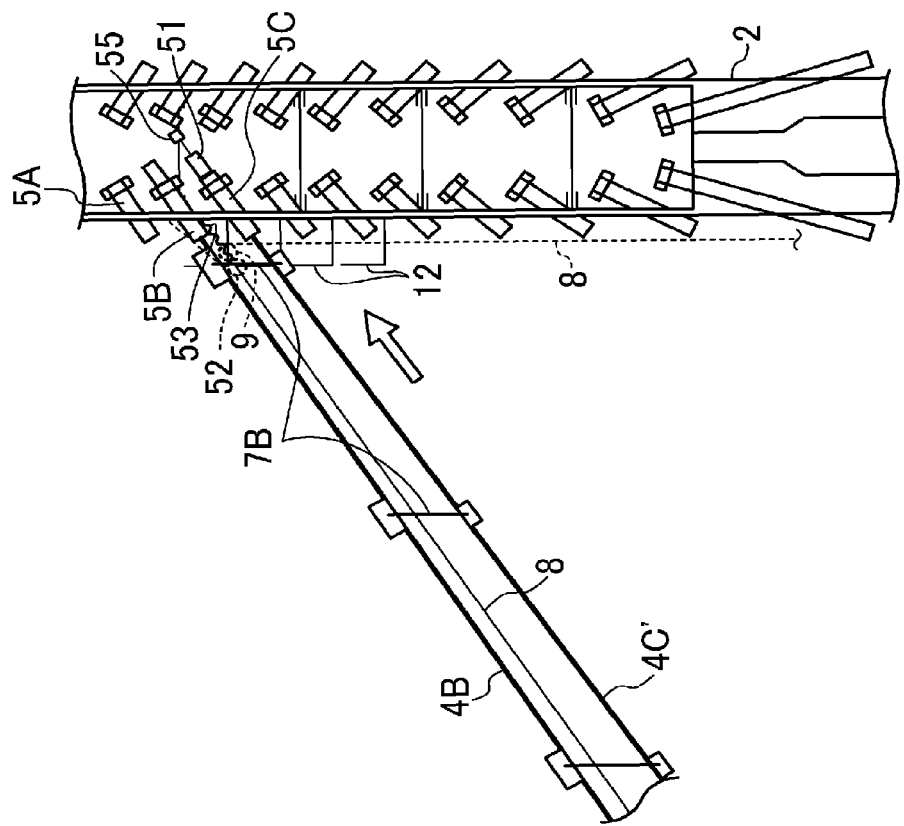

FIGS. 11A and 11B illustrate one step of fixing the stay cable to the main tower in the method of the embodiment for replacing stay cables. FIG. 11A illustrates the main tower viewed from the lateral side of the stay cable. FIG. 11B illustrates the main tower viewed along the bridge deck.

Figure 12:
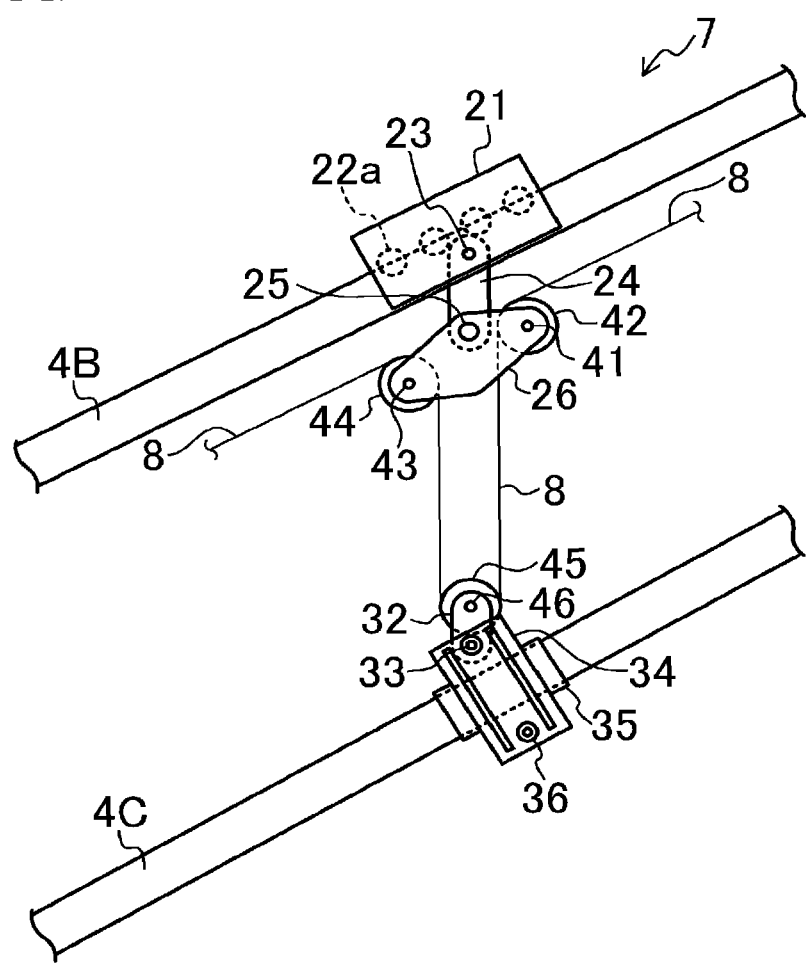

FIG. 12 illustrates a structure of a temporary hanger of an alternative example.

Figure 13A:
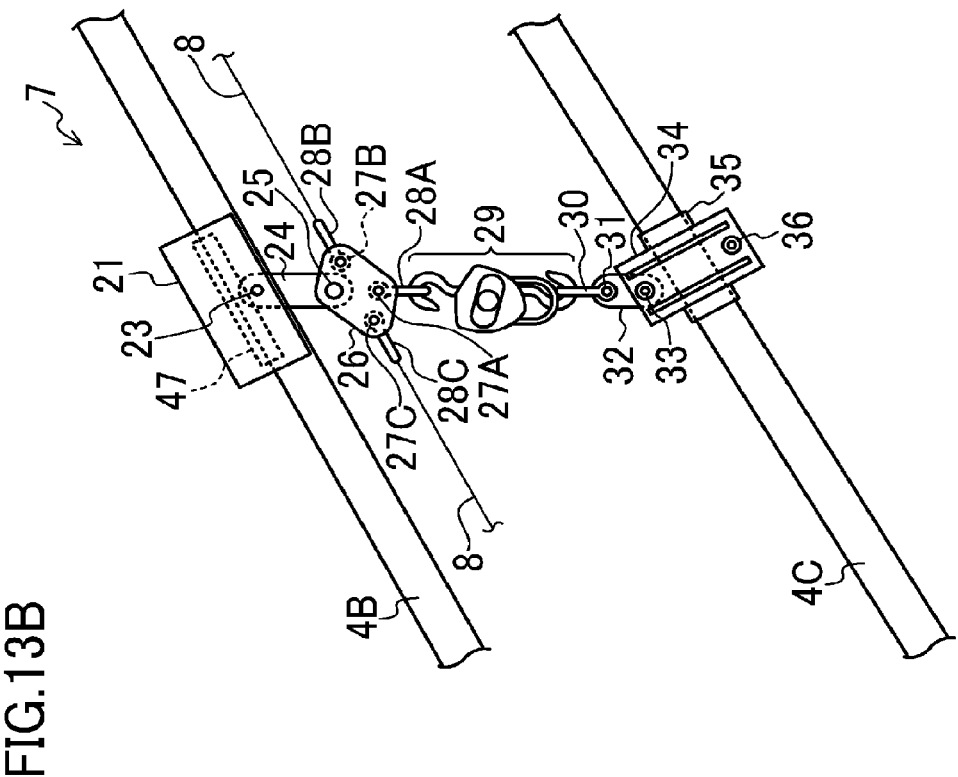
Figure 13B:
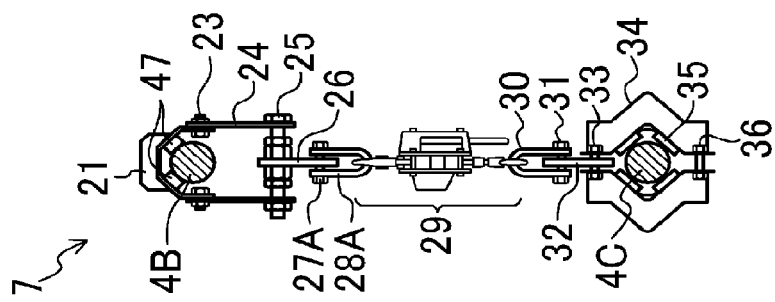

FIGS. 13A and 13B illustrates the structure of the temporary hanger of the alternative example. FIG. 13A illustrates the temporary hanger, of the alternative example, viewed along the stay cable. FIG. 13B illustrates the temporary hanger, of the alternative example, vied from the lateral side of the stay cable.

Figure 14:
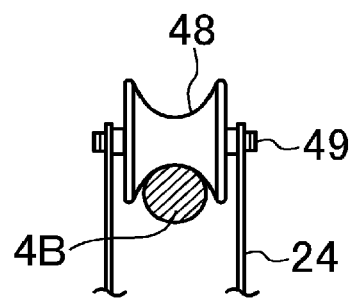

FIG. 14 illustrates a structure of a temporary hanger of a comparison example.

Figure 15:
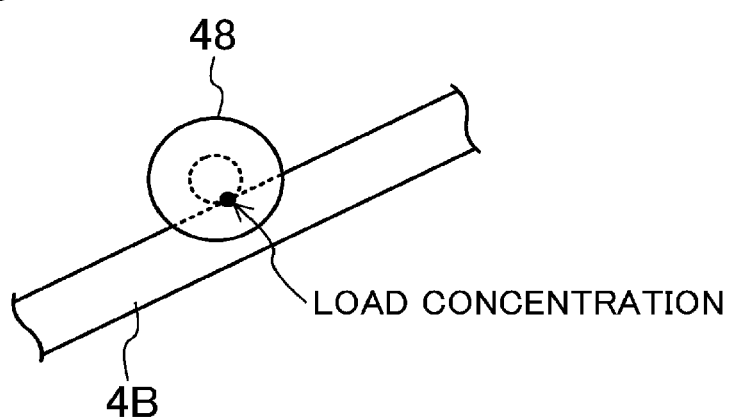

FIG. 15 illustrates that a load concentrates on a contact portion between a rubber roller of the temporary hanger of the comparison example and a stay cable.

Figure 16A:
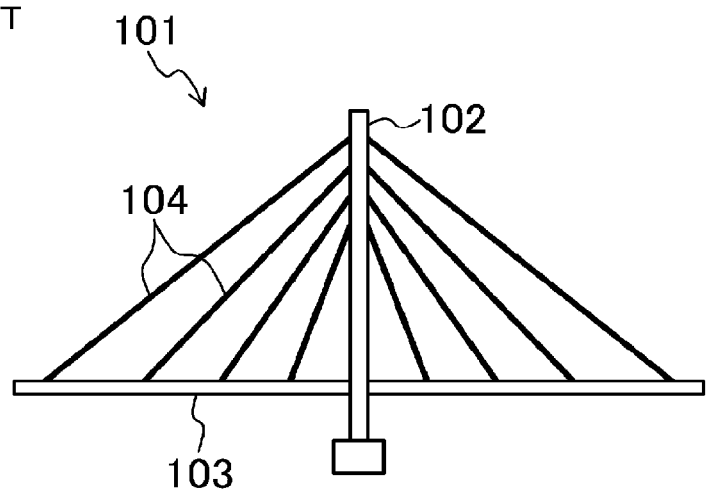
Figure 16B:
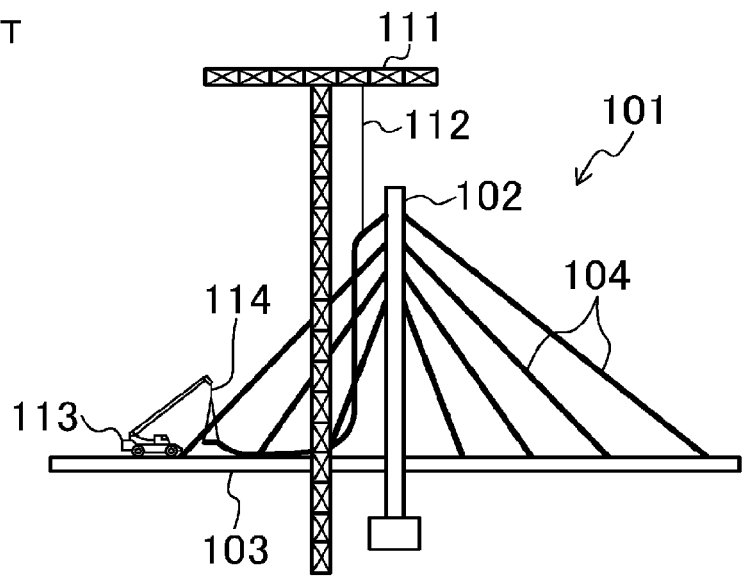

FIG. 16A illustrates a structure of a typical cable-stayed bridge. FIG. 16B illustrates that a stay cable is being hung on the cable-stayed bridge illustrated in FIG. 16A.

Figure 17A:
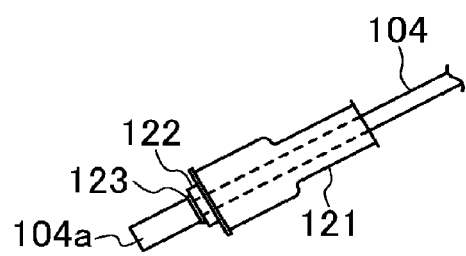
Figure 17B:
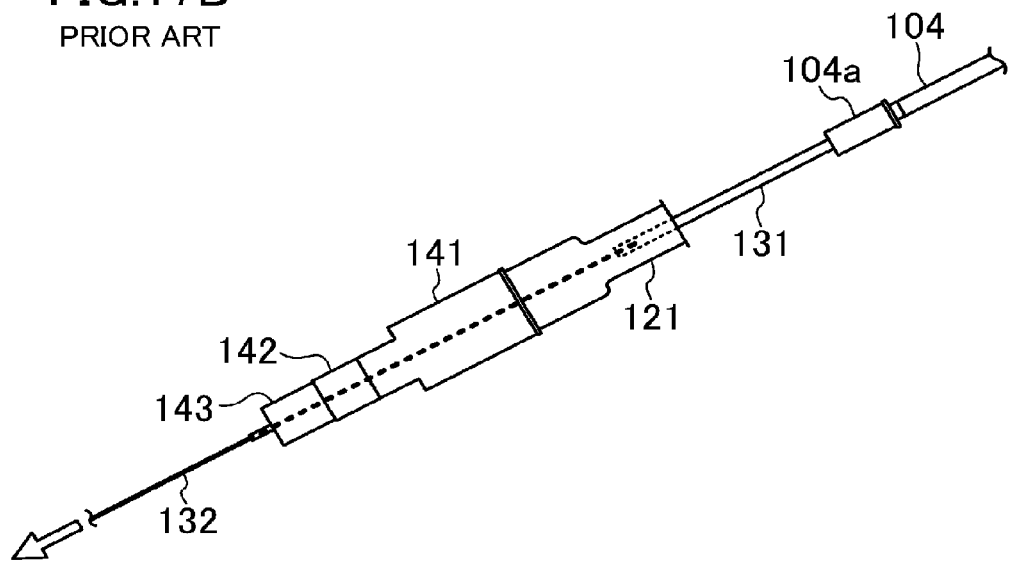

FIG. 17A illustrates structure of the fixing portion on the bridge deck side of the typical stay cable. FIG. 17B illustrates that the stay cable is being pulled into the fixing portion on the bridge deck side in FIG. 17A.

DETAILED DESCRIPTION OF VARIOUS EMBODIMENTS

A method for replacing stay cables and a temporary hanger for replacing stay cables in one embodiment of the present invention will be described with reference to the drawings.

FIGS. 1-4 illustrate a procedure for removing a stay cable in the method of this embodiment.

Figure 1:
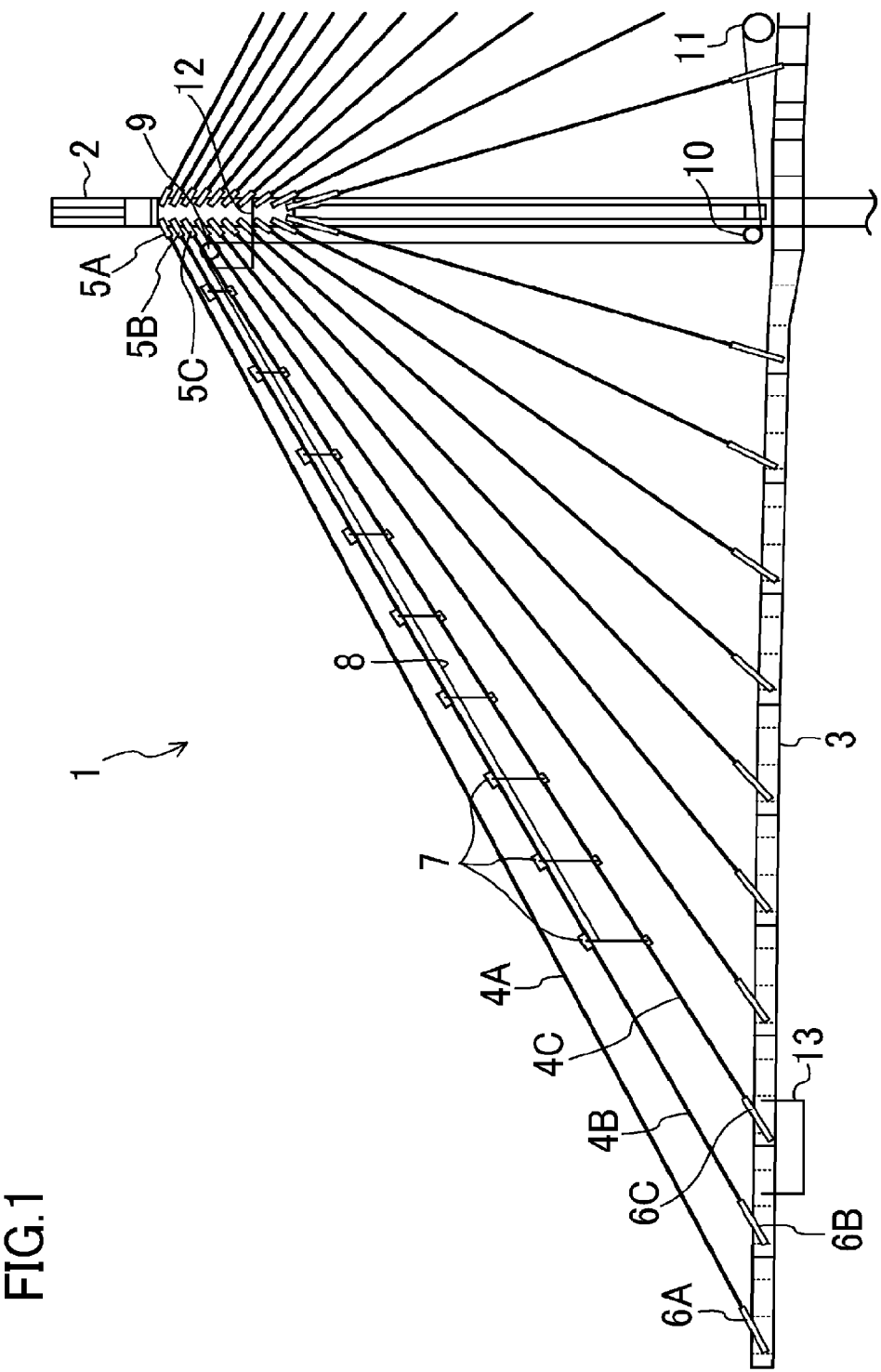
FIG. 1 illustrates one step of removing a stay cable in a method of an embodiment for replacing stay cables.

FIG. 1 illustrates that a cable-stayed bridge 1 includes a vertical main tower 2, a horizontal bridge deck 3, and a plurality of stay cables 4A, 4B, 4C, etc. The bridge deck 3 crosses the main tower 2. The plurality of stay cables 4A, 4B, 4C, etc. are hung in tension and sloped with respect to the main tower 2 and the bridge deck 3. The stay cables 4A, 4B, 4C, etc. are fixed to the main tower 2 by anchor pipes 5A, 5B, 5C, etc. located on the main tower side, respectively. The stay cables 4A, 4B, 4C, etc. are also fixed to the bridge deck 3 by anchor pipes 6A, 6B, 6C, etc. located on the bridge deck side. That is, the bridge deck 3 is supported to the main tower 2 through the stay cables 4A, 4B, 4C, etc.

Assume that the stay cable 4C (hereinafter referred to as the target stay cable 4C) needs to be removed and replaced due to, e.g., a damage. In this embodiment, first, as illustrated in FIG. 1, a scaffolding 12 for replacing the target stay cable 4C is placed near the anchor pipe 5C on the target stay cable 4C. A scaffolding 13 is also placed near the anchor pipe 6C on the target stay cable 4C.

Then, as illustrated in FIG. 1, a plurality of movable temporary hangers 7 are placed on the stay cable 4B (on which the temporary hangers move) hung in tension above the target stay cable 4C. Then, the plurality of temporary hangers 7 are moved to predetermined positions. Then, the target stay cable 4C is held below the plurality of temporary hangers 7. The plurality of temporary hangers 7 are guided by a pulling wire 8 hung in tension toward the main tower 2 below the stay cable 4B. Specifically, in the step of FIG. 1, a first movable temporary hanger 7 is placed on a part, of the stay cable 4B, near the bridge deck 3. Then, this temporary hanger 7 is slightly moved toward the main tower 2 with the pulling wire 8. Then, the next movable temporary hanger 7 is placed on the part, of the stay cable 4B, near the bridge deck 3. Then, this temporary hanger 7 is slightly moved toward the main tower 2 with the pulling wire 8. From then on, another temporary hanger 7 is placed and moved repeatedly so that the plurality of temporary hangers 7 are moved to the predetermined positions on the stay cable 4B. Then, the target stay cable 4C is held below the predetermined positions of the temporary hangers 7.

The pulling wire 8 extends to a winch 11 through pulleys 9 and 10. The pulley 9 is placed near the anchor pipe 5C on the target stay cable 4C. The pulley 10 is placed near the intersection of the main tower 2 and the bridge deck 3. The winch 11 is placed on the bridge deck 3. That is, the pulling wire 8 reeled on the winch 11 moves the temporary hangers 7 toward the main tower 2. The pulling wire 8 unreeled from the winch 11 moves the temporary hangers 7 toward the bridge deck 3.

For example, an operator in a gondola may be lifted to the temporary hanger 7 by a crane to hold the target stay cable 4C below the temporary hangers 7 moved with the pulling wire 8 to the predetermined positions on the stay cable 4B.

Figure 2:
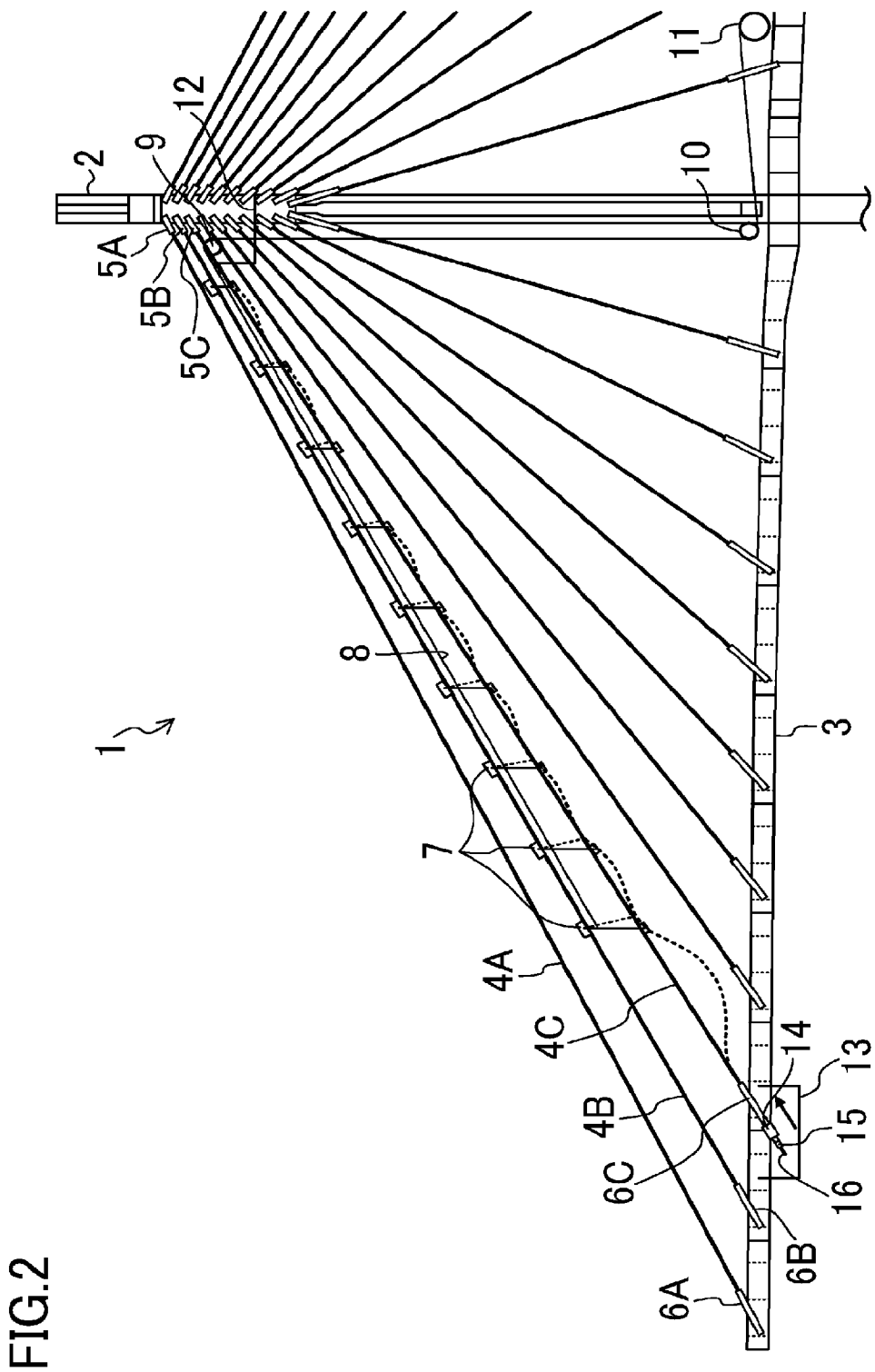
FIG. 2 illustrates one step of removing the stay cable in the method of the embodiment for replacing stay cables.

Next, as illustrated in FIG. 2, the target stay cable 4C held by the plurality of temporary hangers 7 is detached from the anchor pipe 6C. Specifically, a tension rod 16 is mounted on a bridge deck side end (socket) of the target stay cable 4C. A jack 15 is also placed on a lower opening of the anchor pipe 6C through a jack base 14. Then, the target stay cable 4C is pushed out from the anchor pipe 6C by the tension rod 16 upon which the jack 15 acts. Accordingly, the tension of the target stay cable 4C is released. FIG. 2 illustrates, by broken lines, the position of the target stay cable 4C without tension and the positions of the temporary hangers 7.

Figure 3:
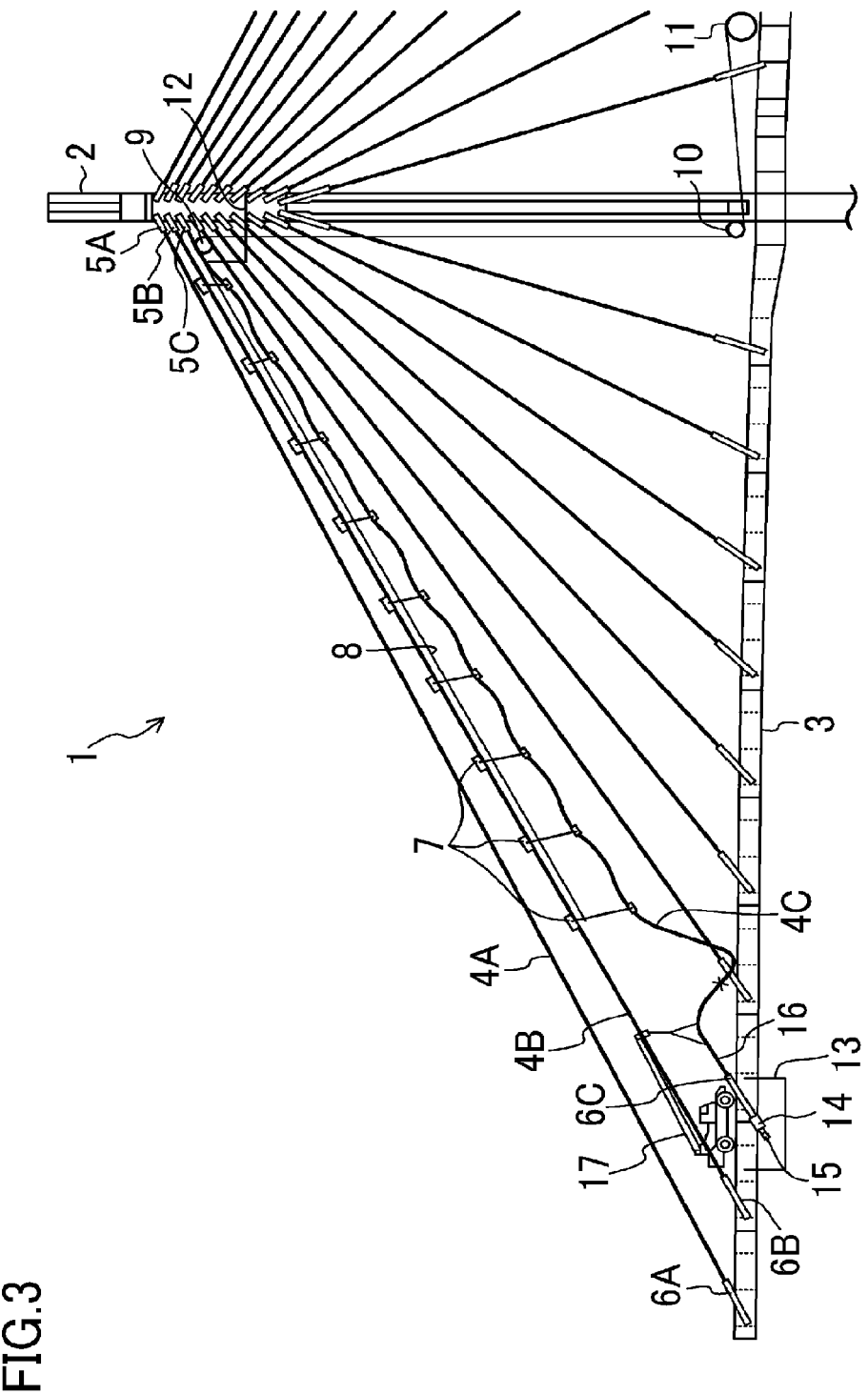
FIG. 3 illustrates one step of removing the stay cable in the method of the embodiment for replacing stay cables.

Next, as illustrated in FIG. 3, the tension rod 16 appearing after the bridge deck side socket of the target stay cable 4C from an upper opening of the anchor pipe 6C is pulled out from the anchor pipe 6C with, e.g., a mobile crane 17 on the bridge deck 3. Here, a vicinity of the bridge deck side socket of the target stay cable 4C may be cut partially.

Figure 4:
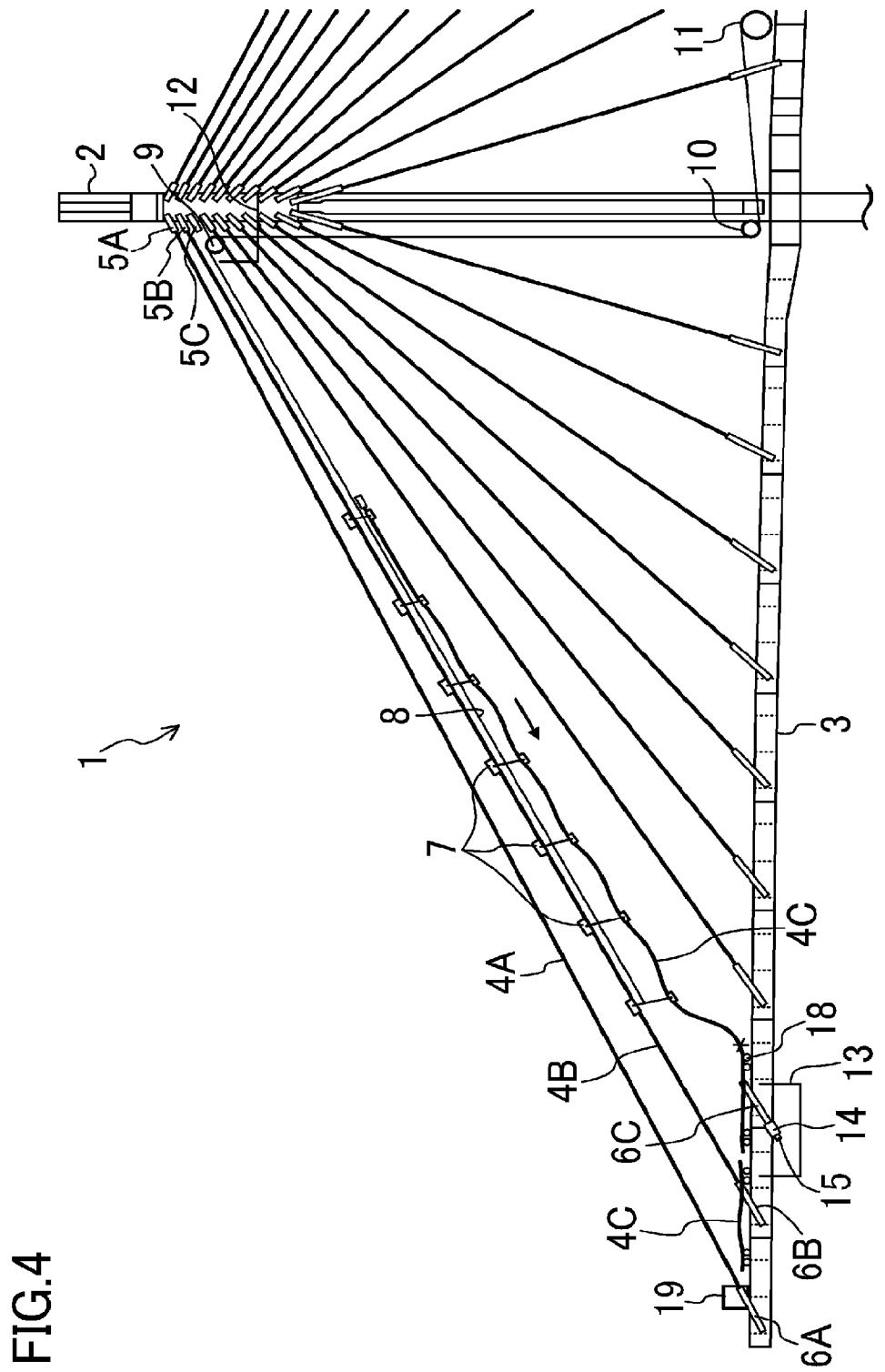
FIG. 4 illustrates one step of removing the stay cable in the method of the embodiment for replacing stay cables.

Next, as illustrated in FIG. 4, the target stay cable 4C held by the plurality of temporary hangers 7 is detached from the anchor pipe 5C. Then, the pulling wire 8 unreeled from the winch 11 moves the plurality of temporary hangers 7 and the target stay cable 4C toward the bridge deck 3 so that the target stay cable 4C is detached from the temporary hangers 7. Then, the target stay cable 4C is cut into short pieces on the bridge deck 3. Then, guide rollers 18 are placed below the short pieces of the target stay cable 4C. Then, these short pieces are removed in turn from the bridge deck 3 with, e.g., a forklift 19. The plurality of temporary hangers 7 placed on the stay cable 4B may not be removed from the stay cable 4B because of the hanging operation of a stay cable replacement described later.

FIGS. 5A and 5B illustrate a detailed structure of the temporary hanger 7 of this embodiment. FIG. 5A illustrates the temporary hanger 7 viewed along the stay cable 4B. FIG. 5B illustrates the temporary hanger 7 viewed from the lateral side of the stay cable 4B.

FIGS. 5A and 5B illustrate that the temporary hanger 7 includes a cable hood 21 covering the top of the stay cable 4B. A plurality of rollers (casters) 22 are attached to the cable hood 21. These rollers (casters) 22 are placed on the stay cable 4B in, e.g., two rows. Specifically, for example, four rollers 22 are provided in each of the rows, i.e., eight rollers 22 in total. The roller 22 includes a wheel 22a and a holder 22b. The wheel 22a is in contact with the stay cable 4B. The holder 22b rotatably holds the wheel 22a. That is, the roller 22 including the wheel 22a rotated on the stay cable 4B by controlling the pulling wire 8 moves the temporary hanger 7 along the stay cable 4B.

A connector 23 such as a bolt connects a lower portion of the cable hood 21 (the lateral portions of the stay cable 4B) with an upper portion of an eye bar 24. A connector 25 such as a bolt connects a lower portion of the eye bar 24 with a pulling wire connector 26. A connector 27B such as a bolt connects one end of the pulling wire connector 26 with a shackle 28B. A connector 27C such as a bolt connects the other end of the pulling wire connector 26 with a shackle 28C. The shackles 28B and 28C connect the temporary hanger 7 with the pulling wire 8 hung in tension below the stay cable 4B. A connector 27A such as a bolt connects a lower portion of the pulling wire connector 26 with a shackle 28A on which an upper portion of an extendable chain block 29 is detachably mounted.

The temporary hanger 7 includes a cable clamp 34 holding the target stay cable 4C. The cable clamp 34 includes protectors 35 and a fastening member 36. The protectors 35 are in contact with the target stay cable 4C. The fastening member 36 such as a bolt holds and releases the target stay cable 4C. A connector 33 such as a bolt connects an upper portion of the cable clamp 34 with a lower portion of an eye bar 32. A connector 31 such as a bolt connects an upper portion of the eye bar 32 with a shackle 30 on which a lower portion of the chain block 29 is detachably mounted.

FIGS. 6-8 illustrate a procedure for hanging a stay cable in the method of this embodiment.

After the target stay cable 4C is detached as illustrated in FIGS. 1-4, the plurality of movable temporary hangers 7 are placed on a portion, of the stay cable 4B, closer to the bridge deck 3 as illustrated in FIG. 6. A stay cable 4C' to be hung (hereinafter referred to as the stay cable replacement 4C') is held below the plurality of temporary hangers 7. Then, the pulling wire 8 reeled on the winch 11 moves the plurality of temporary hangers 7 and the stay cable replacement 4C' toward the main tower 2. If the temporary hangers 7 for removing the target stay cable 4C in FIGS. 1-4 remains on the stay cable 4B, additional temporary hangers 7 do not need to be placed in the step of FIG. 6.

Specifically, first, a vicinity of an end, of the stay cable replacement 4C', closer to the main tower 2 is held with the first temporary hanger 7 near the bridge deck 3. The stay cable replacement 4C' is slightly moved toward the main tower 2 by reeling the pulling wire 8. Then, another portion of the stay cable replacement 4C' is held with the next temporary hanger 7 near bridge deck 3. Then, the stay cable replacement 4C' is slightly moved again toward the main tower 2 by reeling the pulling wire 8. From then on, the stay cable replacement 4C' is held with another temporary hanger 7 and moved repeatedly so that the plurality of temporary hangers 7 and the stay cable replacement 4C' approach the main tower 2.

The stay cable replacement 4C' moved toward the main tower 2 is unreeled in turn from a cable unreeler 20 on the bridge deck 3. The guide rollers 18 are also placed below stay cable replacement 4C' to be moved.

Next, as illustrated in FIG. 7, the stay cable replacement 4C' held with the plurality of temporary hangers 7 is fixed to the anchor pipe 5C. Then, the tension rod 16 is mounted on an end (socket), of the stay cable replacement 4C', closer to the bridge deck 3. The tension rod 16 is inserted into the upper opening of the anchor pipe 6C with, e.g., the mobile crane 17 on the bridge deck 3.

Next, as illustrated in FIG. 8, the tension rod 16 is acted upon by the jack 15 mounted on the lower opening of the anchor pipe 6C through the jack base 14. Accordingly, the stay cable replacement 4C' is pulled into the anchor pipe 6C and given tension. After this pulling by the tension rod 16 is conducted until the bridge deck side socket of the stay cable replacement 4C' appears from the lower opening of the anchor pipe 6C, the stay cable replacement 4C' is fixed to the anchor pipe 6C.

Then, although not shown, the tension rod 16 is detached from the stay cable replacement 4C'. The jack base 14 and the jack 15 are also detached from the anchor pipe 6C. The stay cable replacement 4C' is released from the lower portions (i.e., the cable clamps 34) of the temporary hangers 7 holding the stay cable replacement 4C'. Then, the temporary hangers 7 are moved toward the bridge deck 3 by unreeling the pulling wire 8 from the winch 11. Then, the upper portions (i.e., the cable hoods 21 with the rollers 22) of the temporary hangers 7 are detached from the stay cable 4B For example, an operator in a gondola may be lifted to the temporary hanger 7 by a crane to release the stay cable replacement 4C' from the lower portion (the cable clamp 34) of the temporary hanger 7.

FIGS. 9A, 9B, 10A, 10B, 11A, and 11B illustrate a detailed example of a procedure for fixing the stay cable replacement to the main tower in the method of this embodiment. FIGS. 9A, 10A, and 11A illustrate the main tower viewed from the lateral side of the stay cable. FIGS. 9B, 10B, and 11B illustrate the main tower viewed along the bridge deck.

As illustrated in FIGS. 9A and 9B, the plurality of temporary hangers 7 and the stay cable replacement 4C' is moved toward the main tower 2 by reeling the pulling wire 8. A socket 51 is disposed on the end, of the stay cable replacement 4C', closer to the main tower 2. A pulley 52 is also disposed on the pulling wire 8 near the socket 51. The pulling wire 8 couples the pulley 52 and a pulley 9 disposed near the anchor pipe 5C. The chain block 53 connects the temporary hanger 7A closest to the main tower 2 with the next temporary hanger 7B. The moving direction of the socket 51 is controlled by a lever block (a Japanese registered trademark) 54 in the main tower 2.

Next, as illustrated in FIGS. 10A and 10B, the socket 51 on the stay cable replacement 4C' moved to the vicinity of the main tower 2 is pulled with a chain block 55 in the main tower 2 toward the anchor pipe 5C. Here, the moving direction of the socket 51 is controlled with the lever block 54 in the main tower 2. A plurality of lever blocks 54 are placed as needed.

Then, when the temporary hanger 7A closest to the main tower 2 and the pulley 52 on the pulling wire 8 approach the main tower 2 sufficiently, the temporary hanger 7A is detached, and the other temporary hanger 7B is moved to a predetermined position toward the main tower 2 with the chain block 53.

Next, as illustrated in FIGS. 11A and 11B, the socket 51 on the stay cable replacement 4C' is pulled into the anchor pipe 5C with the lever block 54 and the chain block 55. When the socket 51 appears from the upper opening of the anchor pipe 5C, the stay cable replacement 4C' is fixed to the anchor pipe 5C with, e.g., an anchor nut.

As illustrated in FIGS. 1-4, in the method of this embodiment, the movable temporary hangers 7 are placed on the stay cable 4B hung in tension above the target stay cable 4C. Then, the target stay cable 4C held with the temporary hangers 7 is detached from the bridge deck 3 and the main tower 2. Then, the target stay cable 4C and the temporary hangers 7 are moved toward the bridge deck 3 and removed. That is, the target stay cable 4C is removed without, e.g., a tower crane. This method is useful for removing a stay cable above which another stay cable is hung in tension. Because the target stay cable 4C held with the temporary hangers 7 is removed, the sag of the target stay cable 4C is reduced in the removing operation.

Accordingly, the target stay cable 4C is removed efficiently without an increase in the number of facilities for the removing operation.

As illustrated in FIGS. 6-8, in the method of this embodiment, the stay cable replacement 4C' is held with the movable temporary hangers 7 on the stay cable 4B. Then, the stay cable replacement 4C' and the temporary hangers 7 are moved toward the main tower 2. Then, the stay cable replacement 4C' is fixed to the bridge deck 3 and the main tower 2. In this manner, the stay cable replacement 4C' is hung without, e.g., a tower crane. This method is useful for hanging a stay cable replacement above which another stay cable is hung in tension. Because the stay cable replacement 4C' held with the temporary hangers 7 is hung, the sag of the stay cable replacement 4C' is reduced in the hanging operation. Accordingly, the stay cable replacement 4C' is hung efficiently without an increase in the number of facilities for the hanging operation.

Specifically, the sag of the stay cable hung with, e.g., a tower crane is large. The amount of pulling of the stay cable is also large. Accordingly, the primary pulling by the PC strand and the secondary pulling by the tension rod are required. In contrast, the method of this embodiment reduces the sag of the stay cable replacement 4C' in the hanging operation. The method also reduces the amount of pulling of the stay cable replacement 4C'. Thus, the stay cable replacement 4C' is fixed to the bridge deck by only the pulling of the tension rod 16.

In the method of this embodiment, as illustrated in FIGS. 1-4 and 6-8, the plurality of temporary hangers 7 are guided by the pulling wire 8 hung in tension below the stay cable 4B toward the main tower 2. That is, the temporary hangers 7 are easily moved toward the main tower 2 by reeling the pulling wire 8. The temporary hangers 7 are also easily moved toward the bridge deck 3 by releasing the pulling wire 8.

FIGS. 5A and 5B illustrate that the temporary hanger 7 of this embodiment includes the plurality of rollers (casters) 22 serving as receivers for the stay cable 4B. These receivers move on the stay cable 4B more smoothly than, e.g., a rubber roller that is in contact with the object at one point. These receivers also share the load of the stay cable 4B to cause less damage to a covering material (e.g., polyethylene) of the stay cable 4B. The temporary hanger 7 with the roller 22 including the wheel 22a made of a stronger, more flexible material such as urethane than a rubber material has an adequate strength against the load that the temporary hanger 7 holding the target stay cable 4C or the stay cable replacement 4C' receives.

FIGS. 5A and 5B also illustrate that the temporary hanger 7 of this embodiment includes the chain block 29 disposed below the stay cable 4B. The length of the chain block 29 is adjustable. The distance to the target stay cable 4C or the stay cable replacement 4C' varies with the position of the temporary hanger 7 on the stay cable 4B. The temporary hanger 7 varies in length with the variation of the distance to the target stay cable 4C or the stay cable replacement 4C'. Thus, the target stay cable 4C or the stay cable replacement 4C' is easily held on the lower portion of the temporary hanger 7.

As described above, in this embodiment, a stay cable above which another stay cable is hung in tension is replaced efficiently with simple facilities.

The temporary hanger 7 in FIGS. 5A and 5B is used in the method of this embodiment. However, The structure of the temporary hanger of this embodiment only have to contain the movable mechanism disposed on the stay cable on which the temporary hangers move and which is hung in tension above the target stay cable, and the mechanism that holds the target stay cable.

For example, the length of the temporary hanger 7 in FIGS. 5A and 5B is adjusted with the chain block 29. Alternatively, as illustrated in FIG. 12, the length may be adjusted with a pulling wire 8 itself. FIG. 12 illustrates an alternative example of a temporary hanger 7 viewed from a lateral side of a stay cable 4B. The elements of the temporary hanger 7 in FIG. 12 are labeled with the same reference numerals as those in FIGS. 5A and 5B.

FIG. 12 illustrates the alternative example of the temporary hanger 7. This temporary hanger 7 includes a pulling wire connector 26 mounted on a lower portion of an eye bar 24. A pulley 42 with a connector 41 such as a bolt is mounted on one end of the pulling wire connector 26. A pulley 44 with a connector 43 such as a bolt is mounted on the other end of the pulling wire connector 26. A pulley 45 with a connector 46 such as a bolt is also mounted on an upper portion of an eye bar 32 on an upper portion of a cable clamp 34. The pulling wire 8 extending from the main tower 2 (not shown) along the stay cable 4B is turned toward the target stay cable 4C with the pulley 42. Then, the pulling wire 8 is turned toward the stay cable 4B with the pulley 45. Then, the pulling wire 8 is turned again with the pulley 44 to extend along the stay cable 4B. The distance to the target stay cable 4C (or the stay cable replacement 4C') varies with the position of the temporary hanger 7 on the stay cable 4B. The temporary hanger 7 varies in length with the variation of the distance to the target stay cable 4C (or the stay cable replacement 4C'). Thus, the target stay cable 4C (or the stay cable replacement 4C') is easily held on the lower portion of the temporary hanger 7.

The temporary hanger 7 in FIGS. 5A and 5B includes the cable hood 21 including the plurality of rollers (casters) 22 placed on the stay cable 4B. Alternatively, as illustrated in FIGS. 13A and 13B, a plurality of sliders 47 made of a resin such as nylon may be placed on the stay cable 4B. FIG. 13A illustrates an alternative example of the temporary hanger 7 viewed along the stay cable 4B. FIG. 13B illustrates the alternative example of the temporary hanger 7 viewed from the lateral side of the stay cable 4B. The elements of the temporary hanger 7 in FIGS. 13A and 13B are labeled with the same reference numerals as those in FIGS. 5A and 5B.

FIGS. 13A and 13B illustrate the alternative example of the temporary hanger 7 including the plurality of sliders 47 that are in contact with the stay cable 4B at many points. Similarly to the temporary hanger 7 in FIGS. 5A and 5B, these sliders can share the load of the stay cable 4B to cause less damage to a covering material of the stay cable 4B.

FIG. 14 illustrates a comparison example of a rubber roller 48, viewed along a stay cable 4B, that is in contact with the object at one point. The rubber roller 48 serves as a receiver for a stay cable 4B. FIG. 14 illustrates that an upper portion of an eye bar 24 with a connector 49 such as a bolt is mounted on each end of the rubber roller 48. The eye bar 24 is held not to rotate with the rubber roller 48. FIG. 14 does not illustrate the configuration of the portion below the eye bar 24. This configuration may be the same as that of the temporary hanger 7 in, e.g., FIGS. 5A and 5B.

FIG. 15 illustrates the rubber roller 48, of FIG. 14, viewed from the lateral side of the stay cable 4B. The rubber roller 48 serves as a receiver for the stay cable 4B. The load concentrates on a contact portion between the rubber roller 48 and the stay cable 4B. Thus, the rubber roller 48 may have an insufficient strength against a large load. This concentration of the load may result in a damage to the covering material (e.g., polyethylene) of the stay cable 4B.

In the method of this embodiment, the temporary hanger 7 is guided with the pulling wire 8 hung in tension below the stay cable 4B toward the main tower 2. The pulling wire 8 may be hung in tension in another position. For example, the pulling wire 8 may be hung in tension above the stay cable 4B. Alternatively, the pulling wire 8 may be hung in tension closer to the target stay cable 4C (or the stay cable replacement 4C') than to the stay cable 4B. The winch 11, which is placed on the bridge deck 3 and is used to reel and release the pulling wire 8, may be placed in the main tower 2 with the structure of the main tower 2.

In the method of this embodiment, both of the cable removing operation and the cable hanging operation are conducted with the temporary hanger 7. Alternatively, only one of the cable removing operation or the cable hanging operation may be conducted with the temporary hanger 7.

In the method of this embodiment, the stay cable itself is removed and hung in one operation. In replacing a stay cable of a multi strand type, the strands constituting the stay cable may be replaced with a method similar to that of this embodiment.

The present invention is useful for the method for replacing stay cables supporting a bridge deck to a main tower, and a temporary hanger for use in this method.

What is claimed is:

1. A method for replacing at least one existing stay cable that structurally supports a bridge deck to a main tower, the method comprising the steps of:
   (a) the steps of:
      (i) placing a plurality of movable temporary hangers on the at least one existing stay cable that structurally supports the bridge deck, the plurality of moveable temporary hangers being configured to move along the at least one existing stay cable, the at least one existing stay cable having been previously hung in tension above a target stay cable; and (ii) placing the target stay cable in lower portions of the plurality of temporary hangers;

(b) after step (a), detaching the target stay cable from a bridge deck and a main tower while supporting the target stay cable with the plurality of temporary hangers; and (c) after step (b):
  (i) moving the plurality of temporary hangers and the target stay cable toward the bridge deck while continuing to support the target stay cable with the plurality of temporary hangers; and
  (ii) detaching the target stay cable from the plurality of temporary hangers, such that the target stay cable structurally supports the bridge deck.

2. The method of claim 1, wherein the plurality of temporary hangers are guided by a pulling wire hung in tension toward the main tower below the stay cable on which the temporary hangers move.

3. A temporary hanger for use in the method of claim 1, the temporary hanger comprising a plurality of rollers placed on the stay cable on which the temporary hangers move.

4. A temporary hanger for use in the method of claim 1, wherein a portion, of the temporary hanger, located below the stay cable on which the temporary hangers move varies in length.

5. A method for replacing at least one existing stay cable that supports a bridge deck to a main tower, the method comprising the steps of:

(a) in a bridge deck side, placing a plurality of moveable temporary hangers on the at least one existing stay cable that structurally supports the bridge deck, the plurality of moveable temporary hangers being configured to move along the at least one existing stay cable, the at least one existing stay cable having been hung in tension in advance of the placement of the plurality of moveable temporary hangers thereon above a stay cable replacement to be hung;

(b) placing a replacement stay cable in a lower portion of the plurality of movable temporary hangers;

(c) after the step (b), moving the plurality of temporary hangers and the replacement stay cable from the bridge deck side toward the main tower while supporting the replacement stay cable with the plurality of temporary hangers; and (d) after the step (c), fixing the replacement stay cable to the bridge deck and the main tower such that the replacement stay cable structurally supports the bridge deck, said fixing of the replacement stay cable occurring while continuing to support the replacement stay cable with the plurality of temporary hangers.

* * * * *